United States Patent
Gysi et al.

(10) Patent No.: US 7,975,362 B2
(45) Date of Patent: Jul. 12, 2011

(54) PROCESSING DEVICE AND USE THEREOF FOR THE PRODUCTION OF COVERS WITH A FILM WHICH CAN BE TORN OFF

(75) Inventors: Peter Gysi, Bellikon (CH); Marcel Oberholzer, Kindhausen (CH)

(73) Assignee: Soundronic AG, Bergdietikon (CH)

( * ) Notice: Subject to any disclaimer, the term of this patent is extended or adjusted under 35 U.S.C. 154(b) by 857 days.

(21) Appl. No.: 10/556,660

(22) PCT Filed: May 10, 2004

(86) PCT No.: PCT/CH2004/000282
§ 371 (c)(1),
(2), (4) Date: Nov. 11, 2005

(87) PCT Pub. No.: WO2004/101192
PCT Pub. Date: Nov. 25, 2004

(65) Prior Publication Data
US 2007/0113985 A1    May 24, 2007

(30) Foreign Application Priority Data

May 13, 2003    (CH) .......................................... 836/03
Dec. 18, 2003    (CH) ....................................... 2174/03

(51) Int. Cl.
| B23P 23/06 | (2006.01) |
| B23P 21/00 | (2006.01) |
| B21D 51/44 | (2006.01) |
| B65D 51/20 | (2006.01) |
| B23Q 41/04 | (2006.01) |

(52) U.S. Cl. ...................... 29/564.1; 29/564.7; 29/564.6; 29/563; 72/405.02; 198/345.3; 198/817; 198/690.1; 198/867.04; 53/133.1; 53/133.5; 493/86; 413/58; 413/60; 83/859; 83/613

(58) Field of Classification Search ................... 29/564, 29/564.1, 564.7, 564.6, 563, 33 P; 198/345.3, 198/346.1, 690.1, 867.04, 817, 689.1; 53/410, 53/420, 133.1, 133.5; 493/212, 215, 86; 413/12, 16, 58, 60; 72/404, 405.01, 405.02; 83/859, 597, 613
See application file for complete search history.

(56) References Cited

U.S. PATENT DOCUMENTS
3,472,417 A    10/1969    Fox
(Continued)

FOREIGN PATENT DOCUMENTS
DE    4315416 A1 *    11/1994
(Continued)

OTHER PUBLICATIONS
Machine Translation of EP 439684, which EP 439684 was published in Aug. 1991.*
(Continued)

*Primary Examiner* — Erica E Cadugan
(74) *Attorney, Agent, or Firm* — McCormick, Paulding & Huber LLP

(57) ABSTRACT

The invention relates to a processing device for covers (20), wherein processing stations are embodied as individual processing stations (47) provided with, respectively, one tool for one cover. Several of said stations work in parallel for the simultaneous processing of several covers. If need be, stations can also be used wherein several tools form groups which are functionally separate from each other. As a result, the processing precision and production speed of the objects can be increased.

10 Claims, 7 Drawing Sheets

U.S. PATENT DOCUMENTS

| | | | | |
|---|---|---|---|---|
| 5,361,486 A | * | 11/1994 | Harmsen et al. | 29/563 |
| 6,098,268 A | * | 8/2000 | Negre et al. | 29/563 |
| 6,112,389 A | * | 9/2000 | Boltshauser | 29/33 P |
| 6,122,821 A | | 9/2000 | Dornieden et al. | |
| 2007/0258803 A1 | * | 11/2007 | Gysi | 414/749.6 |
| 2008/0022632 A1 | * | 1/2008 | Gysi et al. | 53/377.7 |
| 2010/0035739 A1 | * | 2/2010 | Gysi et al. | 493/52 |

FOREIGN PATENT DOCUMENTS

| | | |
|---|---|---|
| DE | 198 27 091 A1 | 12/1999 |
| EP | 439684 A1 * | 8/1991 |
| EP | 1 059 130 A1 | 12/2000 |
| EP | 1602421 A1 * | 12/2005 |
| WO | WO 01/07330 | 2/2001 |

OTHER PUBLICATIONS

Machine Translation of EP 1602421, which EP 1602421 was published in Dec. 2005.*

Machine Translation of DE 4315416, which '416 reference was published in Nov. 1994.*

* cited by examiner

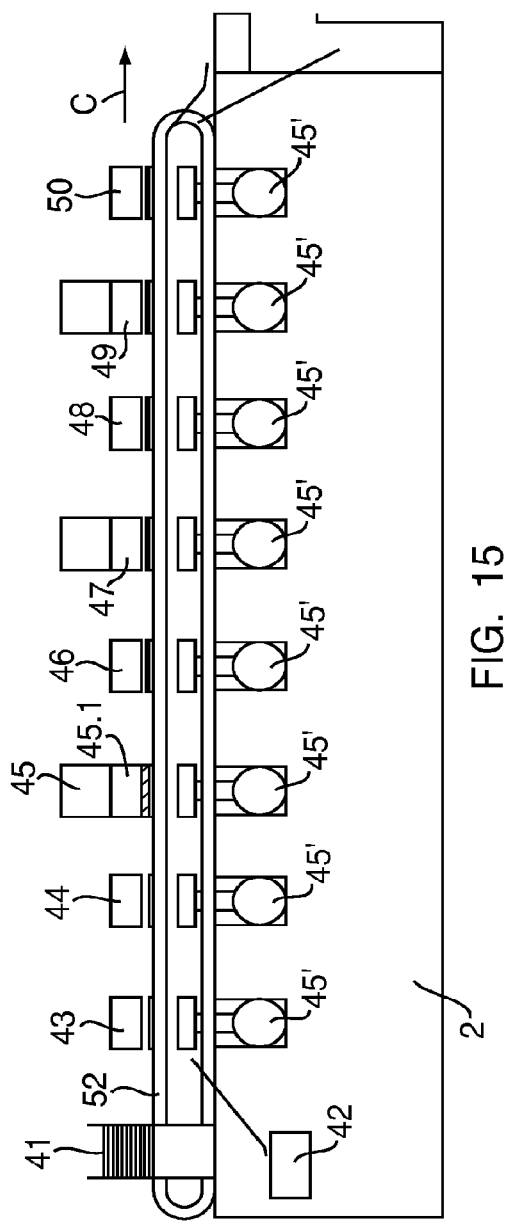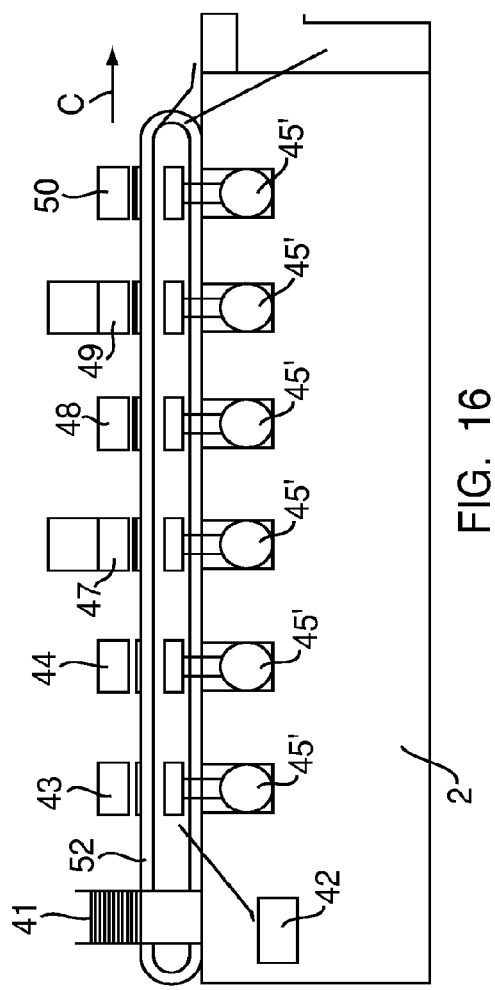

PROCESSING DEVICE AND USE THEREOF FOR THE PRODUCTION OF COVERS WITH A FILM WHICH CAN BE TORN OFF

CROSS REFERENCE TO RELATED APPLICATIONS

This application claims the benefit of PCT Application No. PCT/CH2004/000282, filed on May 10, 2004, Swiss Patent Application No. CH-836/03, filed May 13, 2003, and Swiss Patent Application No. CH-2174/03, filed Dec. 18, 2003, the disclosures of which are herein incorporated by reference in their entirety.

BACKGROUND OF THE INVENTION

The invention concerns a processing device with a number of processing stations, and a processing device and advancing of mechanism for moving a succession of objects in an advancement direction.

It is known to make covers for cans or canister type containers in the form of metal covers permanently fastened to the upper side of the container and which form a dispensing opening closed by a tear away foil, especially a metal foil, applied by heat sealing and which is removed at the time of the first use of the container contents. An additional plastic cover arranged over the metal cover makes the container resealable during the useful life of its contents. A customary processing device for the production of such metal covers is explained in detail in the following with the aid of FIGS. 1 and 2.

The invention has as its object the improvement of processing devices and especially the improvement of such metal cover processing devices.

SUMMARY OF THE INVENTION

These objects are achieved by way of the processing devices according to the present invention. The preferred use is in the making of metal covers. By way of the processing devices of the invention precision in the cover processing can be increased. It achieves a secure adherence of the heat sealing foil of the cover and thereby a smaller number of rejects in the carrying out of the cover production. It produces further the possibility of increasing the production speed.

BRIEF DESCRIPTION OF DRAWINGS

These advantages and further advantages of the invention, and the state of the art, are explained in detail in the following by way of the accompanying figures. The figures are:

FIG. 15 is a schematic side view of a processing device according to another embodiment of the invention.

FIG. 16 is a schematic side view of a processing device according to still another embodiment of the invention.

DESCRIPTION OF PREFERRED EMBODIMENTS

Figure 1:
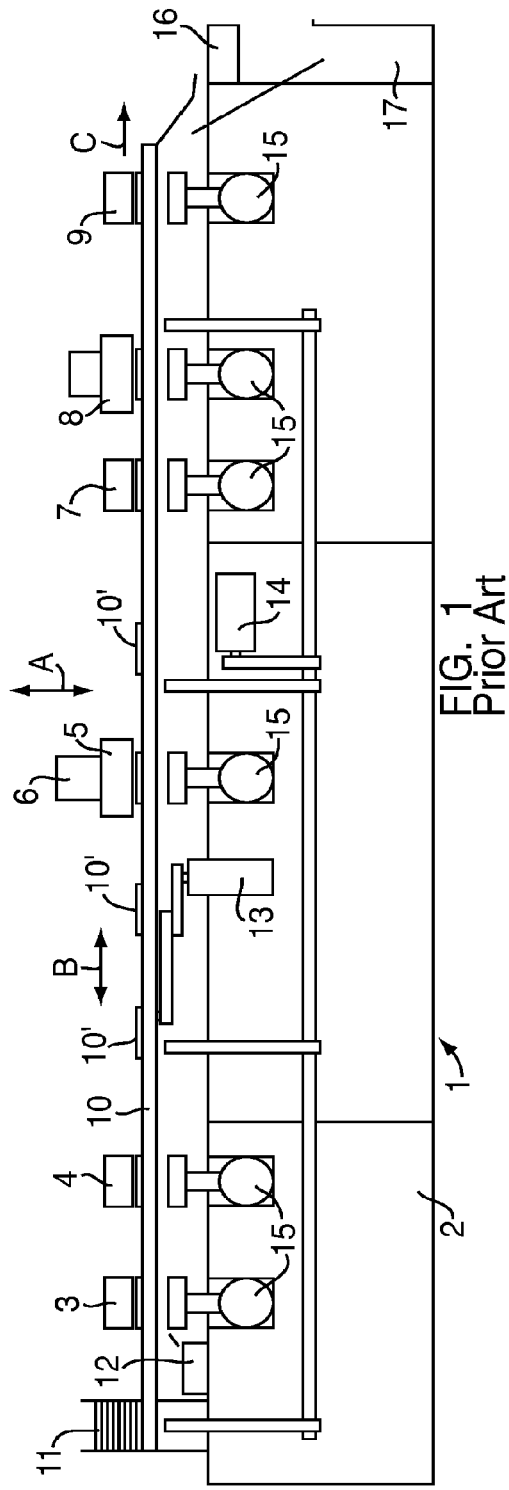
FIG. 1 is a schematic side view of a processing device according to the state of the art.
Figure 2:
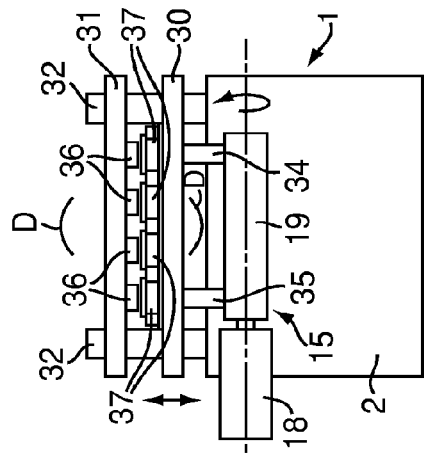
FIG. 2 is a schematic front view of a stamping processing station according to the state of the art.
Figure 5:
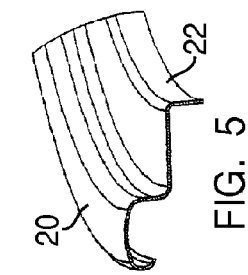
FIGS. 3-9 show sections of metal covers for explaining their production.
Figure 4:
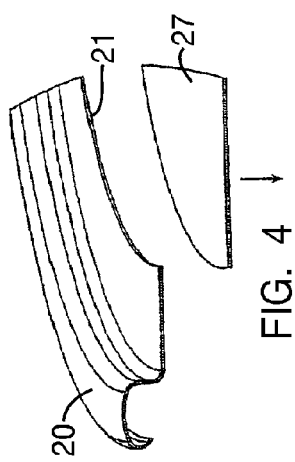
Figure 3:
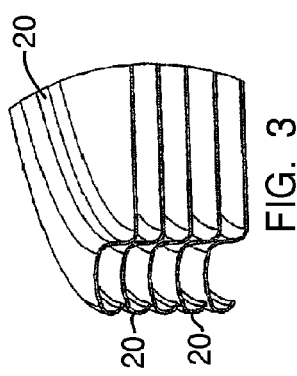

The state of the art concerning a processing device for the production of metal covers with tear away foils will now be explained briefly with the aid of FIGS. 1-9. FIG. 1 shows a schematic side view of such a device 1, which on a machine frame 2 has several processing stations 3-9. An advancing mechanism 10, 13, 14, advances objects in the advancement direction, indicated by the arrow C, from the beginning of the apparatus at the stack 11 to the end of the apparatus, where the objects become deposited in receiving bins 16 or 17 by way of chutes. The objects are removed from the stack 11 in a known way and moved onto the advancement mechanism. This advancement mechanism has 2 elongated bars 10 respectively arranged laterally on the objects, which bars lift objects lying on holders 10' at stations 3-9 upon the lifting of the bars 10 by means of the drive 14 upwardly in the direction A and then displace them by a forward movement in the direction of the arrows B (directed in the same direction as the arrow C) by way of the crank drive 13 by a given forward amount. Thereafter the bars are moved downwardly in the direction of the arrows A whereby the objects are again moved to their positions of being held by holders. The rods 10 are then moved downwardly beneath the held positions of the objects in the arrow direction B and are then moved rearwardly oppositely to the arrow C, and thereafter the described process is carried out anew. The objects between their transport rest at their holder positions and are thereby at the processing stations and are there processed. After one processing step of all the processing stations a new advancement takes place. FIG. 3 shows stacked metal cover blanks 20 as an example of objects, which are on hand in the stack 11. These blanks 20 are, for example, round metal disks of, for example, 11 cm. diameter. Obviously, other basic shapes, for example, rectangular or square disks and other diameters are possible. The blanks 20 are already pre-formed, in a non-illustrated processing device, at their edges as shown in FIG. 3. In FIG. 3, and in each of the subsequent figures, only a section of an entire disk is shown in order to simplify the drawing. In the first processing station 3 of FIG. 1 by a stamping process using upper and lower work tools an opening is stamped in the disk, which is visible in FIG. 4, in which a figure the edge of the opening is indicated at 21 and the stamped out round disk is indicated at 27. This disk 27 falls as waste into the container 12 of FIG. 1. The stamping processing station 3 is driven by a drive 15, which will be explained in more detail. At the processing station 14 a drawing of the edge 21 downwardly takes place whereby the development of the edge to that as shown in FIG. 5 takes place. The circularly shaped cover blank 20 moves then to the processing station 5, in which a foil 25 is placed over the opening of the cover 20 and is there fastened to the cover by way of heat sealing, as is to be seen in FIGS. 6 and 7. The metal foil 25 is provided in a known way with a plastic film on its underside. The needed round foil blank 25 as a rule is stamped in station 5 from a wide foil web and is placed over the middle aperture of the circularly shaped disk and by way of the heat sealing station the foil under the effect of heat is pressed onto the round aperture of the part 20 so that the foil 25 is connected to the metal cover 20 by the melting and subsequent cooling of the plastic layer. This is known and is not described in further detail here. In any event, for cooling a cooling processing station 7 can be provided. In the processing station 8 the foil 25 is provided with a coining processing, and the edge 22 is further flanged into the finished edge 23. In a station likewise indicated as a processing station 9 the finished cover is now subjected to an inspection, which in general includes a sealing ability test for the tear off foil 25 applied to the cover. If the foil is found to be tightly sealingly fastened to the remainder of the metal cover, the cover moves into the receiver 16 for the finished covers. If an untight sealing condition is found, the cover moves by way of the other illustrated chute into the waste container 17. According to the state of the art, several covers arranged perpendicularly to the advancement direction are simultaneously processed at each processing station. FIG. 2 shows this for the stamping processing station 3, wherein a known stamping device is illustrated. This device includes four supporting columns 32, of which those located behind the illustrated supporting columns in the viewing direction are not visible. Arranged on these supporting columns are the upper work tool carrier 31 and the lower work tool carrier 30, which respectively carry the upper stamping tools 36 and the lower stamping tools 37. These stamping tools are multiple tools, so that in the illustrated example four covers are stamped at the same time. The upper or the lower work tool carrier is driven for carrying out the stamping motion, and in FIG. 2 the motion is that of the lower work tool holder 30 which shown to be driven by the drive 15, which drive consists of a drive motor 18 and an eccentric shaft 19, which by way of push rods 34, 35 move the lower work tool carrier up and down under the guiding of the columns 32. To increase the number of covers produced, the width of the processing device can be increased so that therefore the stamping processing station 3 of FIG. 2, for example, processes six or eight covers simultaneously with a more multiple work tools instead of the illustrated four covers. Attempts to increase the number of covers stamped per unit of time can also be made by increasing the number of reciprocating strokes of the stamping station per unit of time and correspondingly the cadence of the further processing stations. An increase of the reciprocating rate is opposed by the considerable masses of the processing stations. With a widening of the processing stations, there results an accompanying bending of the work tool carriers 30 and 31 because of the high stamping forces, which bending is indicated by the curved lines D. This necessitates a correspondingly more stable design of the work tool carriers and results again in considerably larger masses. It has been shown that the tight sealing of the tear-off foil 25 onto the cover part 20 is very strongly dependant on the quality of the stamping in the processing station 3. Even a slight increase in the bending of a work tool carrier can lead to bad sealing of the finished covers.

Figure 10:
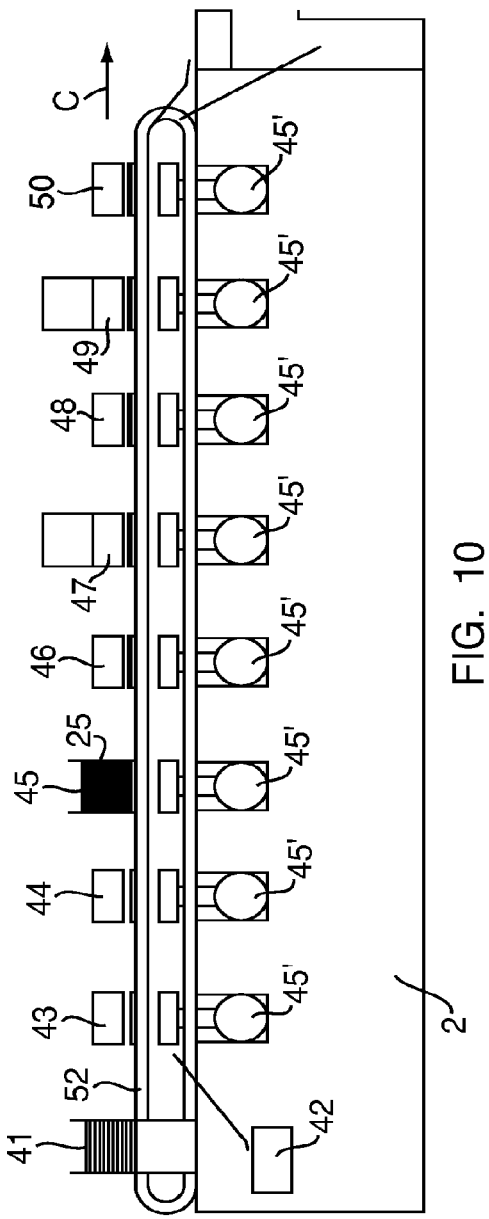
FIG. 10 is a schematic side view of a processing device according to one embodiment of the invention.
Figure 11:
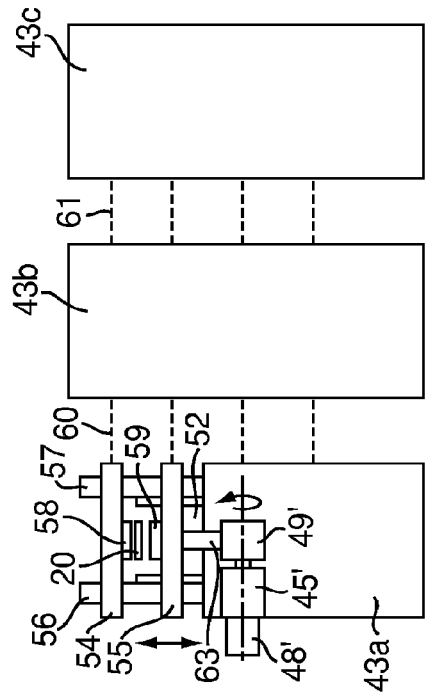
FIG. 11 is a schematic front view of a stamping processing station of the processing device.

FIGS. 10 and 11 now show a first embodiment of a processing device according to the invention. In it, as the preferred example, the object processing is carried out with basically the same method steps as in the processing of a cover according to FIGS. 3-9. On a frame 2 are arranged the processing stations 43 to 50. An advancement mechanism 52 again transports the cover parts to be processed stepwise in the advancement direction C through the processing stations, so that the advancement mechanism can basically be an advancement mechanism corresponding to the described state of the art. Preferably, however, the advancement mechanism 52 has another form, namely a belt shaped form, which in the following will be described in more detail. The cover parts 20 of FIG. 3 are arranged in a stack 41 and are basically moved from the stack and onto the advancement mechanism in a known way. The first processing station 43 again stamps the opening in the disks 20 and thereby stamps out the plates 27. These plates move into the waste container 42. A drive 45' drives the stamping station. FIG. 11 now shows a front view of one embodiment of a processing station, as an example of the stamping station 43, according to the invention. This has functionally separate units for the stamping station. Therefore, there are in the example three units 43a, 43b, and 43c shown next to one another, each of which processes only one cover, so that in the illustrated example perpendicularly to the advancement direction three covers are simultaneously processed. Each unit 43a, 43b, 43c is functionally so independent of the other units that the bending forces arising from the processing in the processing station, and for example the stamping processing station, have no or only insubstantial effect on the other processing stations. In the example of FIG. 11, each processing station is therefore an entirely separate unit; each of which for itself alone has four columns 56, 57 for the upper work tool carrier 54 with the work tool 58 for one cover, and for the lower work tool carrier 55 with the lower work tool 59 for only one cover. A drive 45' with a motor 48' and eccentric 49' work on the lower work tool holder 55 through a push rod 63. Obviously this holder can also be stationary and the upper work tool holder 54 can be moved up and down. Next to the mentioned parts of the illustrated unit of the processing station 43a, is a further unit 43b illustrated only as a rectangular box and a further unit 43c likewise illustrated as a rectangular box. These units are basically constructed identically to the described first unit 43a. It is to be seen that with this construction of a processing station the bending even in the case of a relatively low mass construction can be held to be very small, and especially because of the functional independence of the other units the bending is independent of how many units are placed next to one another. Instead of the illustrated three units, which permit the processing of three covers simultaneously, obviously any desired number of units can be placed next to one another. For example, six units or also eight units. This increase in the number of units does not increase the bending of the individual work tool carriers at all, so that the processing precision remains the same even in the case of simultaneously processing a large number of objects or covers. Obviously, the work tool holders and the units which lie next to one another can also be coupled, as is indicated by the lines 60. In this case, the functional separation of the units in respect to their bending relationships is not made poorer. Instead of a separate drive 45' for each of the units a common drive for the individually driven work tool carriers 55 of all of the units can be provided, or a group of individual units can be provided with a common drive.

Figure 12:
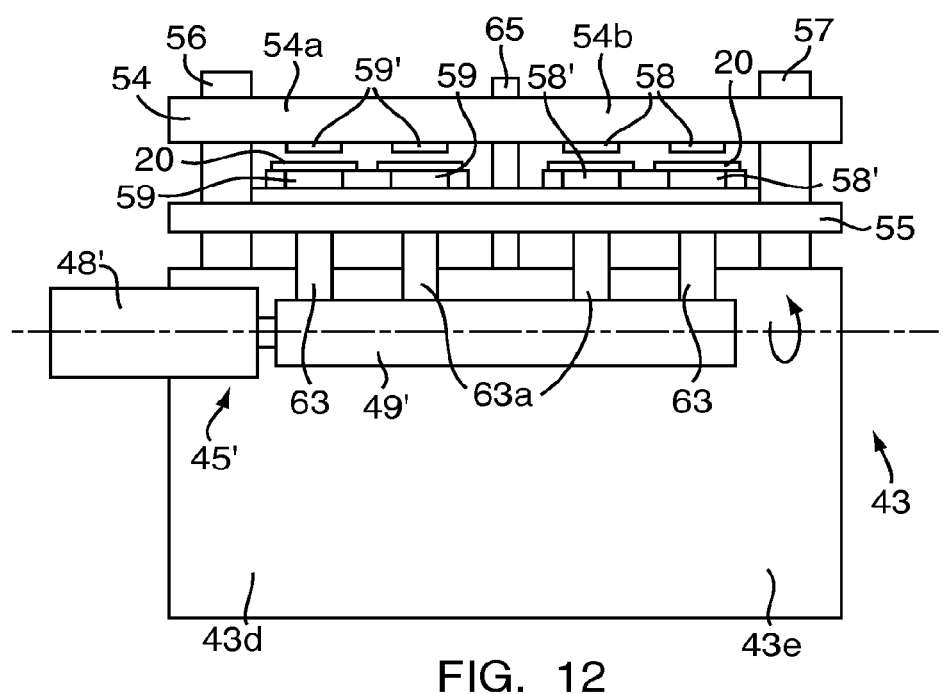
FIG. 12 is a schematic front view of a further stamping processing station.

FIG. 12 shows a further embodiment of the processing stations according to the invention, wherein by way of example, the stamping station 43 is again shown. Similar reference numbers as used in FIG. 11 are used to indicate the same elements. In this embodiment, the lower work tool 59 and the upper work tool 59' together, and the lower work tool 58' and the upper work tool 58 together each form a functionally separate unit 43d or 43e, wherein the upper work tool holder 54 is for example, so supported by way of two additional columns 65 that each side 54a, 54b of the work tool holders lying on both sides of the columns 65 forms a functionally separate unit in regard to the bending. The lower work tool holder can likewise in this way be separately constructed, but in this example its shown as a single plate which carries the four work tools 59 and 58', and which by way of further push rods 63a is supported essentially in the middle of the eccentric shaft 49. In this way, each unit with the two work tools on both sides of the push rods 63a can be viewed as a functionally separate unit in regard to the bending behavior. Obviously, groups of more than two work tools can also be formed so that, for example, two groups each having three work tools are formed, each of which groups forms a functionally separate unit. If more covers are to be produced simultaneously, two of the processing stations 43 of FIG. 12, for example, can be placed next to one another, as been shown for the individual stations of FIG. 11, so that next to one another eight covers can be simultaneously processed, without the appearance of the negative bending behavior of an eight part multiple work tool.

In FIG. 10 the further processing stations can be implemented likewise in the way portrayed by the stamping station according to FIG. 11 or FIG. 12 as functionally separate units of individual work tool processing stations or processing stations with groups of work tools. The processing station 44 is therefore in this case one in which the drawing of the edge 22 in accordance with FIG. 5 is carried out. The processing station 45 illustrated in FIG. 10 shows a variant, in which precut cover foils 25 are arranged in a stack 41 and are individually taken from the stack and laid onto a cover part and are possibly pre-supplied with adhesive to fix them for further transport. In this station 45, however, a foil stamping work tool 45.1 can be provided as shown in FIG. 15 which stamps the foil 25 directly from a large foil web and adheres it to the cover part, for example, by point or area wise heat application. Also the station 45 is, as mentioned, implemented as an individual work tool station or as a station with groups of work tools which are functionally separate from one another.

The station 46 can be a heating station which possibly is intelligent. Advantageously, such a heating station operates in a non-contacting manner by using, for example, induction or infrared radiation, with the result that its simple mechanical implementation supports high repetition rates.

Finally, the station 47 is the actual sealing station which operates in the style and in the way of the prior art and sealingly fastens the foil 25 to the lid part 20 by heat sealing. Obviously, in known ways, the stations 45 and 46 can be omitted as shown in FIG. 16 and the stamping out of the foil 25, its placement on the cover opening, and its fastening can all take place in the station 47.

It will be understood, however, that the separation of the functions "stamping out of the foil for the heat sealing", "pre-adhering" and/or "pre-warming" into different processing stations is advantageous and especially in combination with the construction of the processing stations so as to have functionally separated units has advantageous effects which are: Because of the individual stations increased repetition rates are possible, since now smaller masses are to be accelerated. The separation of the processing functions has as its result that for each processing stroke in the individual processing stations fewer functions are to be filled, which can be carried out in more simple mechanical ways (smaller masses) which now support and makes realizable possibly higher repetition rates.

Also a synergy exists between the individual work stations and the pre-warming: by way of the individual work stations the bending of the work tool holders is inhibited; with the result that the work tool itself remains directed parallel to the direction of reciprocation. In the case of the bending of the work tool holders in the conventional multiple work tool carrier as mentioned above, this is not the case; the work tools stand perpendicularly on the bending lines and are no longer arranged parallel to the reciprocating direction. Therefore, the stamping of the foil and of the covers, and the quality of the heat-sealing in each of these cases is negatively influenced with increases in the repetition rate. Especially the heat sealing cannot any longer be carried out with the required quality in the case of a work tool holder according to the state of the art with such a desired larger number of work tools on a work tool holder.

If now, for example, pure plastic foils instead of the conventional metal foil layered with plastic is to be used for the processing the cutting tolerance and the cutting gap amounts to about one thousandths of a millimeter. An inclined positioning of the work tool because of the bending of the work tool holder is, as mentioned, here especially contra-productive because of the very small cutting gap.

Because of the pre-warming the need for a strong heating at the sealing station is avoided, which substantially reduces its thermal expenditure, which eases the maintenance of a constant processing temperature difference. Therefore, the heating delay can be held under control so that the required tolerance can be reliably held also in the case of the processing of plastic foils in the region of a thousandths of a millimeter during the production process. The foil itself and the cover ring can be pre-warmed separately, each to an optimal temperature, which must not be the same. The pre-warming temperature itself can be determined by a person skilled in the art for the materials used.

The individual work stations, supported by the separation of the different functions, as mentioned above, permits higher repetition rates; the pre-warming processing of plastic foil, which must be stamped while maintaining cutting gaps in the area of a thousandths of a millimeter, at the desired high repetition rates.

Figure 8:
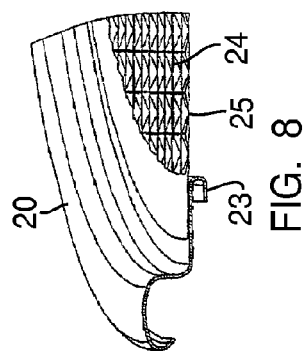
Figure 7:
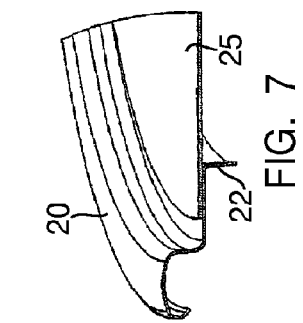
Figure 6:
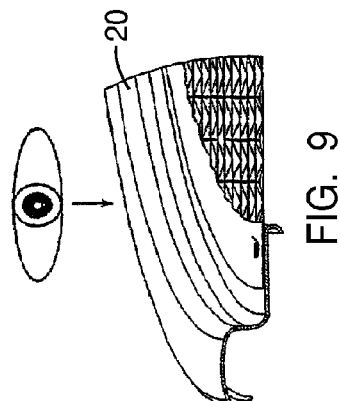
Figure 9:
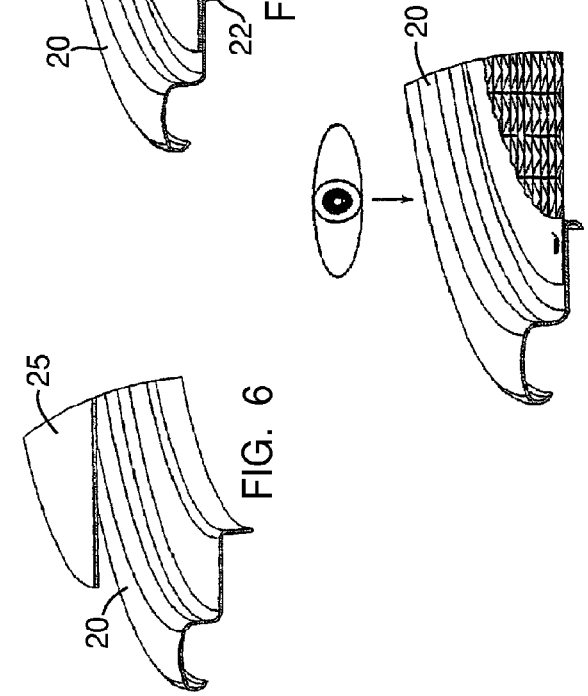

A processing station 48 is an intelligent cooling station while the processing station 49 is again one, which takes on the coining of the foil and the flanging of the cover part 20 in the way already explained by way of FIG. 8. Especially this processing station is again preferable and according to the invention implemented with individual stations according to FIG. 11 or with combined but functionally separate stations according to FIG. 12. The same can be the case for the inspection station 50, which again separates the tightly sealed covers from the possibly unsealed covers.

Figure 13:
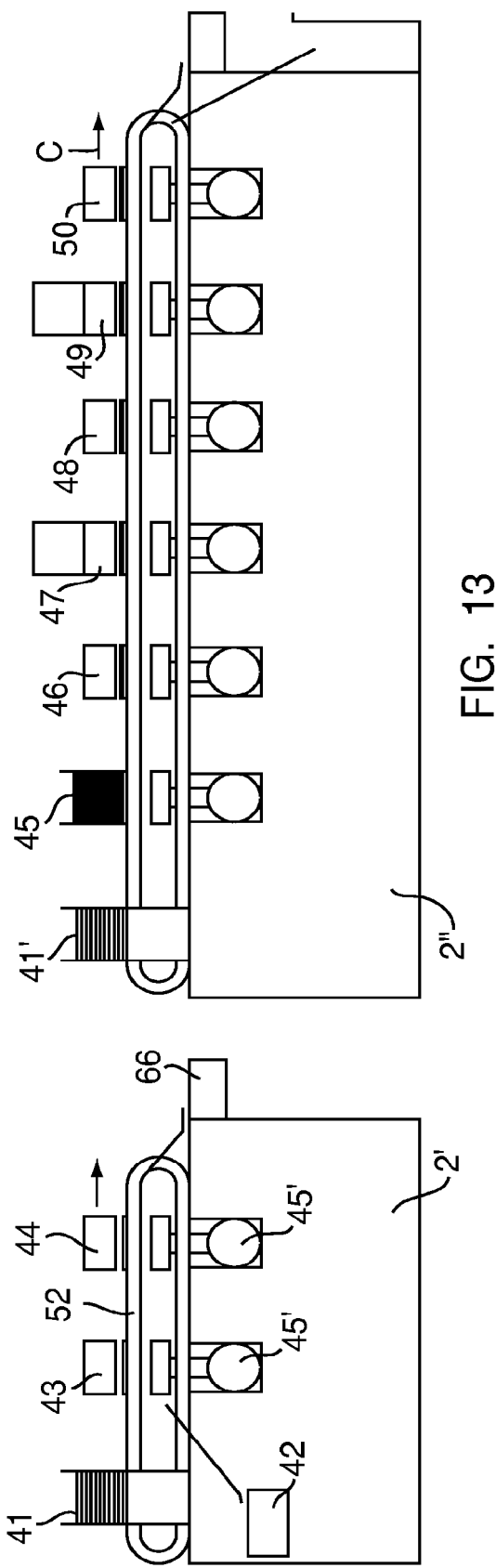
FIG. 13 is a further processing device.

FIG. 13 shows a further embodiment, which basically is constructed similarly to the embodiment of FIGS. 10-12. In this case however, the processing devices are constructed as modules, with one module being indicated at 2' and the other module being indicated at 2". For the elements which are similar to those of FIGS. 10-14 the same reference numerals have been used. So the stack 41 as well as the processing stations 43 and 44 are provided in the module 2'. Therefore the processed cover parts corresponding to FIG. 5 then move into a receiver 66. In the module 2' there is provided a stack 41' for the corresponding the already stamped out and drawn cover parts according to FIG. 5 and these are removed from the stack and subsequently moved to the processing stations 45, 46 and 48, in the event these are provided, and in any event into the processing stations 47, 49 and 50, as has already been described.

Figure 14:
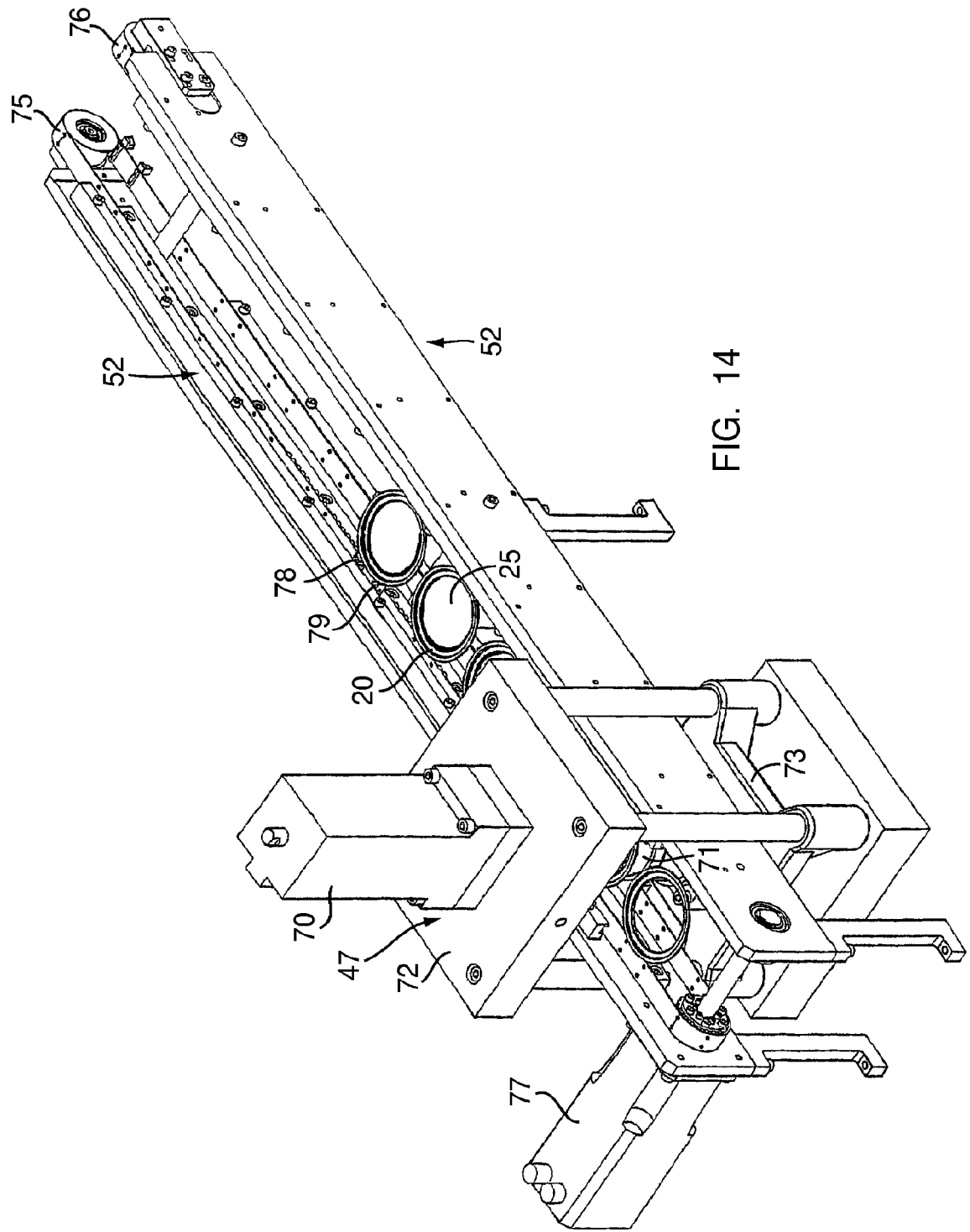
FIG. 14 is a further processing device in partial three-dimensional representation.

FIG. 14 shows in three-dimensional representation a part of a processing device according to the invention wherein this is implemented as a single row processing device, in which therefore in each of the processing stations only a single work tool and not a group of work tools work on the object. FIG. 14 shows as a working station only the heat-sealing station 47, with the supply of the foil for the tear-off foil being not illustrated. The same reference numbers as previously are used again to indicate the same elements. The work tool in this case is a heated stamping and sealing sliding tool such as is known and is not herein explained in more detail. This sliding tool in the illustrated example is driven from above by a drive 70 and impacts onto the cover part 20 carried by the lower work tool 71. Also in this case by implementation of the processing stations as being for a single object a bending of the upper plate 72 and the lower plate 73 which form the work tool holders and receivers, even by high stamping and sealing pressures is practically eliminated. A preceding and succeeding processing stations are not illustrated in this figure, but correspondingly are constructed as processing stations for a single object. Also, in the case of this embodiment, obviously many such individual processing devices can be placed next to one another as functionally separate devices, when several rows of covers are to be processed simultaneously. Also, the remaining implementation can be carried out similarly to that of FIG. 11 or 12. In FIG. 14, the circulating conveyor arrangement 52 is now explained in more detail, with this arrangement having two circulating conveyor belts 75 and 76 with a corresponding drive 77. The two conveyor belts 75 and 76 are synchronously driven. In this way, individual conveying stretches of the advancing arrangement 52 can be formed or the entire advancing arrangement can be made as a single stretch with correspondingly long belts 75 and 76 being used. The drive 77 effects a transportation in the advancing direction in such way that the conveyor bands are stopped when the objects, for example, the covers, are located in the processing stations, in order for them to be processed at those stations. After the carrying out of the processing steps the conveyor bands are again moved by one step in the advancing direction so that each cover is moved into its next processing station. The objects or covers lie on both sides with their edge regions on the conveyor belts. Preferably fixing means are arranged on the belts which shapewise mate with the covers or objects in the advancing direction so that no shifting of the objects takes place as a result of their advancement. For the circular covers in FIG. 14 the fixing elements for one cover are shown at 78 and 79, which elements are fixed to the conveyor belts and so mate with the corresponding fixing or holding elements arranged on the outer circumference of the covers lying on the conveyor belts that the covers are fixed in the transport direction and in the opposite direction and also in the direction perpendicular to the transport plane. Nevertheless, a lifting of the cover upwardly without anything further is possible. The holding means 78 and 79 can for this also be lightly magnetically implemented so that the magnetic force has to be overcome for the lifting of the cover 20 from the conveyor belt 75. The holding means 78 and 79 are shown only for the one cover in the drawing and in the case of the other covers are omitted for simplicity. Nevertheless, on the conveyor belts, which as a rule and as indicated are toothed belts, the fastening points for the remaining holding means are indicated. The advancing arrangement 52 with the two belts is preferably also useful in the case of the processing devices according to FIGS. 10-13. Also, for desired other processing or advancement mechanisms the advancing arrangement with two parallel belts is useful.

Such an advancing arrangement is especially advantageous when high repetition rates are to be realized in an arrangement with several processing stations. An advancing arrangement according to the described state of the art has masses, which move back and forth; therefore, with high repetition rates reinforcements against deformations are necessary and therefore again an increased driving power is required, which is undesirable. The above described, belt implemented advancing arrangement avoids such disadvantage.

In conclusion, the present invention makes available different measures for improving the drive of an apparatus of the initially mentioned kind. On one hand, the functional independence of the individual work tools (and of work tool pairs consisting of upper and lower work tools) permits an increase in the repetition rate; on the other hand, this is supported by the arrangement of individual operations (stamping, pre-warming adhesion, sealing, etc.) at each operating station. Likewise in regard to the pre-warming with the help of non-contacting methods such as in induction, etc. Each of these measures alone improves a device according to the state of the art; different combinations of individual measures permit mass reduction solutions for certain applications (for example, stamping of the foil by the apparatus according to the invention or a stacked stamped out foil cover in the device of the invention). An improvement in the repetition rate and in the quality is always achieved (trouble free stamping by pre-heating or unchanged orientation of the work tools with respect to their reciprocating direction).

Accordingly, within the field of the present invention lie one or more of the proposed measures for use in solving the objects of the present invention.

The invention claimed is:
1. A processing device comprising:
an advancing mechanism; and
a plurality of processing stations arranged in succession along an advancement direction,
wherein the advancing mechanism is adapted to advance a single row succession of objects along the advancement direction and comprises two conveyor belts arranged parallel to one another and driven in synchronism by a common drive, wherein a plurality of individual object receivers comprising opposed means for fixing an object about its perimeter are formed on the conveyor belts, and
wherein each of the plurality of processing stations is equipped to process a single object at a time, and
wherein the device is adapted to produce metal covers with tear-off foils, and
wherein one of the plurality of processing stations is a stamping processing station comprising an upper work tool and a lower work tool for the stamping of at least one hole.
2. The processing device according to claim 1, wherein one of the plurality of processing stations is a drawing processing station for drawing the edge of the at least one hole, and
wherein one of said processing stations is a sealing processing station for applying a tear-off foil over the at least one hole.
3. The processing device according to claim 2, wherein the sealing processing station is adapted to stamp at least one tear-off cover from a foil and place the at least one tear-off cover over the at least one hole.
4. A processing device according to claim 2 further characterized in that the sealing processing station is one equipped to apply a previously stamped out tear-off cover.
5. A processing device according to claim 2 further characterized in that the sealing processing station is connected in series with a stamping out station for the tear-off cover or in series with a station for taking a tear-off cover from a stack of such covers.
6. A processing station according to claim 5 further characterized in that the sealing processing station is connected in series with an adhesion station and/or a pre-warming station.
7. A processing device according to claim 1, wherein one of the plurality of processing stations is a coining station for coining at least one tear-off foil, and
wherein one of the processing stations is a bending station for bending an edge of at least one hole.

8. The processing device according to claim 1,
wherein the plurality of processing devices further comprises a sealing processing station which is connected to the stamping processing station by way of the advancing mechanism.

9. The processing device according to claim 1, wherein the opposed means are magnetic holding means.

10. A processing device comprising: an advancing mechanism; and
a plurality of processing stations arranged in succession along an advancement direction,
wherein the advancing mechanism is adapted to advance a single row succession of objects along the advancement direction,
wherein each of the plurality of processing stations is equipped to process a single object at a time,
wherein the advancing mechanism comprises two conveyor belts arranged parallel to one another and driven in synchronism by a common drive,
wherein a plurality of individual object receivers comprising opposed means for fixing an object about its perimeter are formed on the conveyor belts,
wherein the device is adapted to produce metal covers with tear-off foils,
wherein at least one of the plurality of processing stations is a stamping processing station comprising an upper work tool and a lower work tool for the stamping of at least one hole, said stamping processing station further comprising an upper work tool carrier and a plurality of columns for supporting the upper work tool;
wherein one of the plurality of processing stations is a drawing processing station for drawing the edge of the at least one hole, and
wherein one of the plurality of processing stations is a sealing processing station for applying a tear-off foil over the at least one hole.

* * * * *